United States Patent [19]
Tozu et al.

[11] Patent Number: 5,624,164
[45] Date of Patent: Apr. 29, 1997

[54] BRAKING FORCE DISTRIBUTION CONTROL SYSTEM

[75] Inventors: Kenji Tozu, Kariya; Kenji Asano, Toyota; Noriaki Hattori, Anjo, all of Japan

[73] Assignee: Aisin Seiki Kabushiki Kaisha, Kariya, Japan

[21] Appl. No.: 614,723

[22] Filed: Mar. 13, 1996

Related U.S. Application Data

[62] Division of Ser. No. 144,434, Nov. 2, 1993, Pat. No. 5,547,264.

[30] Foreign Application Priority Data

| Nov. 4, 1992 | [JP] | Japan | 4-319475 |
| Nov. 16, 1992 | [JP] | Japan | 4-330062 |
| Nov. 16, 1992 | [JP] | Japan | 4-330071 |

[51] Int. Cl.$^6$ .................................. B60T 8/40
[52] U.S. Cl. ............. 303/9.62; 303/113.5; 303/116.1; 303/119.1
[58] Field of Search ............. 303/9.62, 9.69, 303/116.1, 117.1, 119.1, 113.1, DIG. 1, DIG. 2, 113.2, 113.3, 113.5, 114.1, 116.2

[56] References Cited

U.S. PATENT DOCUMENTS

| 4,589,706 | 5/1986 | Leiber . |
| 4,699,436 | 10/1987 | Klein .................. 303/119.1 X |
| 4,778,223 | 10/1988 | Inoue . |
| 4,800,289 | 1/1989 | Adachi et al. . |
| 4,836,618 | 6/1989 | Wakata et al. . |
| 4,912,641 | 3/1990 | Kuwana et al. . |
| 5,015,045 | 5/1991 | Nishii . |
| 5,221,125 | 6/1993 | Okochi et al. . |
| 5,281,012 | 1/1994 | Binder et al. . |

FOREIGN PATENT DOCUMENTS

| 3722010 | 1/1989 | Germany . |
| 3727257 | 2/1989 | Germany . |
| 51-40816 | 11/1976 | Japan . |
| 64-47664 | 2/1989 | Japan . |
| 64-47665 | 2/1989 | Japan . |
| 64-74156 | 3/1989 | Japan . |
| 3-284463 | 12/1991 | Japan . |
| 5-278585 | 10/1993 | Japan . |
| 2136519 | 9/1984 | United Kingdom . |
| 2153939 | 8/1985 | United Kingdom . |
| 2169975 | 7/1986 | United Kingdom . |
| 2173559 | 10/1986 | United Kingdom . |
| 2176556 | 12/1986 | United Kingdom . |

OTHER PUBLICATIONS

Von Rüdiger Lichnofsky und Hnas–Joachim Ohnemüller, "ABS, ASR und MSR der Neuen S-Klasse", *ATZ Automobiltechnische Zeitschrift*, pp. 322–331, 1992.

*Primary Examiner*—Peter M. Poon
*Attorney, Agent, or Firm*—Burns, Doane, Swecker & Mathis, LLP

[57] ABSTRACT

An arrangement for controlling the braking force applied to a rear wheel in a certain relationship with a braking force applied to a front wheel so as to provide an ideal braking force distribution includes an auxiliary power source for discharging a power pressure and a dynamic hydraulic braking pressure regulator for regulating the power pressure to a pressure regulated in a certain relationship with the hydraulic braking pressure discharged from a master cylinder. Pressure control valves are disposed in a hydraulic circuit which communicates the pressure regulator with a rear wheel cylinder. The control valves control the hydraulic pressure in the rear wheel cylinder in a certain relationship with the hydraulic pressure in the front wheel cylinder.

7 Claims, 13 Drawing Sheets

BRAKING FORCE DISTRIBUTION CONTROL SYSTEM

This application is a divisional of application Ser. No. 08/144,434, filed Nov. 2, 1993 now U.S. Pat. No. 5,547,264.

BACKGROUND OF THE INVENTION

1. Field of the Invention

The present invention relates to a braking force distribution control system for controlling a braking force applied to a rear wheel in a braking operation of a vehicle, and more particularly to the control system for controlling the braking force applied to the rear wheel in a certain relationship with the braking force applied to a front wheel.

2. Description of the Prior Art

In general, when a running vehicle is braked, axle loads applied to the front and rear portions of the vehicle respectively will be different from each other due to the moving load caused by the braking operation. Therefore, the braking force applied to a front wheel and the braking force applied to a rear wheel for locking all the wheels simultaneously are not in direct proportion to each other, but in such a relationship as indicated by a one-dotted chain line in FIG. 13. This relationship is known as an ideal braking force distribution which varies depending upon the condition with or without load. The distribution under the condition with load will be the one as indicated by a two-dotted chain line in FIG. 13.

If the braking force applied to the rear wheel exceeds the braking force applied to the front wheel, the directional stability of the vehicle will be deteriorated. In order to keep the braking force applied to the rear wheel lower than that applied to the front wheel and provide a distribution in close proximity to the ideal braking force distribution, a proportioning valve is provided between the rear wheel brake cylinder and the master cylinder. With this arrangement, a distribution characteristic has a break point as indicated by a phantom line in FIG. 13. When the difference of the loads applied to the inner and outer wheels of a turning vehicle is taken into consideration for example, it is necessary to reduce the braking force applied to the rear wheel much lower than the braking force applied to the front wheel. In addition, when the loadage is large, the distribution will be far remote from the ideal braking force distribution. Therefore, a load sensing proportioning valve is installed in a truck or the like to provide a distribution characteristic with a break point which varies in response to the loadage.

In Japanese Publication for Opposition No. 51-40816, it is proposed to vary the break point of the distribution characteristic for the proportioning valve by a pneumatic actuator, in accordance with a result of a comparison between the rotational speeds of the front and rear wheels. In that publication, is disclosed a structure which provides a high break point when the rotational speed of the rear wheel is higher than that of the front wheel, and provides a low break point when the rotational speed of the rear wheel is lower than that of the front wheel.

According to the above-described arrangement in the prior art, however, it is insufficient to provide a proximate ideal braking force distribution with respect to the front and rear wheels of the vehicle. Since the braking force distributed to the rear wheel is reduced in the prior art, a large force will have to be applied to the brake pedal for producing a desired deceleration of the vehicle. Otherwise, a large load will be applied to the front wheel braking system. Or, a large braking force will be distributed to the rear wheel, so that the rear wheel will be likely to be locked.

SUMMARY OF THE INVENTION

Accordingly, it is an object of the present invention to provide a braking force distribution control system for use in a vehicle, and provide a proximate ideal braking force distribution by a simple arrangement.

It is another object of the present invention to provide a stable braking force distribution control irrespective of variable wheel speeds of front and rear wheels of the vehicle.

It is a further object of the present invention to provide a smooth braking operation for a transitional period from the braking force distribution control to the normal braking operation at the termination of the braking force distribution control.

In accomplishing the above and other objects, a braking force distribution control system is provided for controlling a braking force applied to a rear wheel of an automotive vehicle in a certain relationship with a braking force applied to a front wheel of the automotive vehicle. The system includes a front wheel brake cylinder which is operatively connected to the front wheel for applying the braking force thereto, and a rear wheel brake cylinder which is operatively connected to the rear wheel for applying the braking force thereto. A master cylinder is provided for pressurizing a brake fluid fed from a reservoir and supplying a hydraulic braking pressure to the front wheel brake cylinder in response to depression of a brake pedal. Pressure control valves are disposed in a hydraulic circuit which communicates the pressure regulator with the rear wheel brake cylinder to control the hydraulic braking pressure in the rear wheel brake cylinder. An auxiliary power source is communicated with the reservoir to pressurize the brake fluid fed from the reservoir and discharge a power pressure. A dynamic hydraulic braking pressure regulator such as a hydraulic booster is communicated with the auxiliary power source to regulate the power pressure to a pressure regulated in a certain relationship with the hydraulic braking pressure discharged from the master cylinder in response to depression of the brake pedal. And, a controller is provided for actuating the pressure control valves to control the hydraulic braking pressure in the rear wheel brake cylinder in a certain relationship with the hydraulic braking pressure in the front wheel brake cylinder.

The braking force distribution control system may further include wheel speed sensors for detecting wheel speeds of the front wheel and the rear wheel, and a comparator for comparing the wheel speeds of the front wheel and the rear wheel detected by the sensors. And, the controller is arranged to actuate the pressure control valves in response to the result of comparison made in the comparator so as to control the hydraulic braking pressure in the rear wheel brake cylinder in a certain relationship with the hydraulic braking pressure in the front wheel brake cylinder. A certain condition for terminating the control of the hydraulic braking pressure by the controller is determined. Then, a pulse increase mode is provided to repeat holding and increasing operations of the hydraulic braking pressure in the rear wheel brake cylinder, and further a special pulse increase mode is provided to increase the hydraulic braking pressure in the rear wheel brake cylinder at an increasing rate raised in accordance with a lapse of time after the terminating condition has been fulfilled.

The braking force distribution control system may further include wheel speed sensors for detecting wheel speeds of the front wheel and the rear wheel, and may be arranged to provide a certain increasing rate for each of the wheel speeds of the front and rear wheels detected by the sensors and calculate a first set speed on the basis of the increasing rate for each of the front and rear wheels, provide a certain decreasing rate for each of the wheel speeds of the front and rear wheels detected by the sensors and calculate a second set speed on the basis of the decreasing rate for each of the front and rear wheels, and select a medium value of the first set speed, the second set speed and the wheel speed of the front wheel or rear wheel detected by the sensors to set a standard speed for each of the front and rear wheels. It is so arranged that the standard speed of the front wheel and the standard speed of the rear wheel are compared, and that the controller actuates the pressure control valves in response to the result of comparison to control the hydraulic braking pressure in the rear wheel brake cylinder in a certain relationship with the hydraulic braking pressure in the front wheel brake cylinder.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
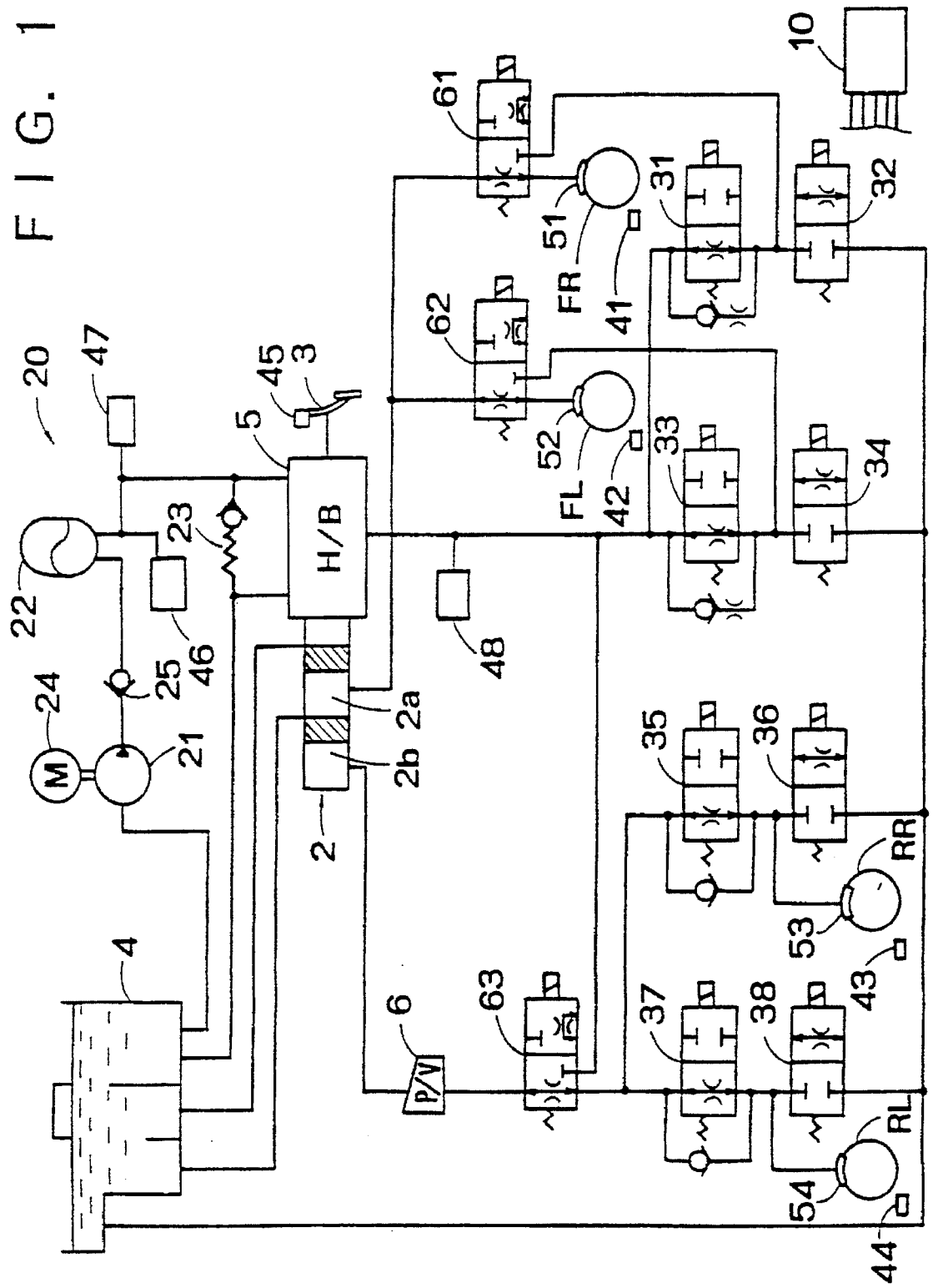
FIG. 1 is a general block diagram illustrating a braking force distribution control system according to an embodiment of the present invention.

Referring to FIG. 1, there is schematically illustrated a braking force distribution control system according to the present invention, which controls a braking force applied to each of wheels FR, FL, RR, RL of a vehicle individually depending upon a braking condition.

Referring to FIG. 1, a hydraulic pressure generator 2 comprises a tandem master cylinder 2 and a hydraulic booster 5 operated in response to depression of a brake pedal 3. An auxiliary pressure source 20 is connected to the hydraulic booster 5, and these are connected to a low pressure reservoir 4 respectively. Wheel brake cylinders 51 to 54 are connected to the wheels FR, FL, RR, and RL, respectively. The wheel FR designates the wheel at the fore right side as viewed from the position of a driver's seat, the wheel FL designates a wheel at the fore left side, the wheel RR designates a wheel at the rear right side, and the wheel RL designates a wheel at the rear left side. In the present embodiment, a so-called Y circuit system has been employed for the rear wheels RR, RL as shown in FIG. 1, while a so-called X circuit system may be employed. A rear wheel drive system, where the rear wheels RR, RL are driven, has been employed in the present embodiment. However, a front wheel drive system may be employed.

There are disposed solenoid valves 61, 62 in hydraulic circuits for connecting a pressure chamber 2a of the master cylinder 2 to the front wheel brake cylinders 51, 52, respectively. The solenoid valves 61, 62 are connected to the hydraulic booster 5 through a normally open solenoid valves 31, 33, and also connected to a normally closed solenoid valves 32, 34, which are connected to the low pressure reservoir 4. A proportioning valve 6 and a solenoid valve 63 are connected to a pressure chamber 2b of the master cylinder 2. In the hydraulic circuits for connecting the solenoid valve 63 and the rear wheel brake cylinders 53, 54, there are disposed normally open solenoid valves 35, 37 respectively. The wheel brake cylinders 53, 54 are connected to the low pressure reservoir 4 through normally closed solenoid valves 36, 38 respectively. These solenoid valves 35 to 38 serve as pressure control valve means according to the present invention.

The auxiliary pressure source 20 includes a pump 21, an accumulator 22 and a relief valve 23. The pump 21 is driven by an electric motor 24, so that a brake fluid is fed from the low pressure reservoir 4 and raised to a predetermined pressure and supplied through a check valve 25 to the accumulator 22 to be stored therein. A relief valve 23 is provided for returning the brake fluid to the low pressure reservoir 4 when the discharged hydraulic braking pressure exceeds a predetermined pressure, to thereby decrease the hydraulic braking pressure. At the output side of the accumulator 22 are disposed a pressure sensor 46 which provides an output signal linear to the hydraulic pressure, and a low pressure switch 47 which turns on when it detects a pressure lower than a predetermined value. Thus, a so-called power pressure is discharged from the auxiliary pressure source 20, and supplied to the hydraulic booster 5.

The hydraulic booster 5, which serves as the dynamic hydraulic braking pressure regulating means according to the present invention, is arranged to regulate the hydraulic braking pressure discharged from the auxiliary power source 20 by a spool valve (not shown) which is actuated in response to depression of the brake pedal 3, and boost the master cylinder 2 by the regulated pressure. The hydraulic boosters are disclosed in Japanese Patent Laid-open Publication Nos. 64-47664, 64-47665 and 64-74156, for example, each disclosure of which is incorporated by reference in its entirety. The hydraulic booster 5 of the present embodiment is so arranged that the discharged pressure is regulated to provide a pressure higher by a certain rate (e.g., 20%) than the pressure discharged from the master cylinder 2 (therefore, regulated to a pressure corresponding to 120% of the pressure discharged from the master cylinder 2). Then, the hydraulic circuits are so arranged that the regulated pressure is fed to the wheel brake cylinders 51 to 54, through the solenoid valves 31, 33 and the solenoid valves 63, 35, 37. There is provided a regulated pressure switch 48 which turns on when the regulated pressure exceeds a predetermined pressure. A regulator as disclosed in the above-identified publications may be substituted for the dynamic hydraulic braking pressure regulating means according to the present invention, so as to be constructed separately from the master cylinder 2.

Accordingly, the solenoid valve 63, which serves as a changeover valve according to the present invention, is disposed between the master cylinder 2 and the solenoid valves 35 to 38 which serve as pressure control valve means according to the present invention. And, the proportioning valve 6 is disposed between the solenoid valve 63 and the master cylinder 2. The hydraulic circuits at the drain side of the solenoid valves 32, 34 and the solenoid valves 36, 38 are connected to the low pressure reservoir 4, which receives the brake fluid returned from the solenoid valves 32, 34, 36, 38 through the hydraulic circuits at their drain sides, and stores the brake fluid for supplying the same to the master cylinder 2 and etc.

Each of the solenoid valves 61 to 63 is a three ports-two positions solenoid operated changeover valve, and is in its first operating position as shown in FIG. 1 when a current is not fed to its solenoid coil, so as to allow the wheel brake cylinders 51 to 54 to communicate with the master cylinder 2 and prevent them from communicating with the hydraulic booster 5. When the current is fed to the solenoid coil, each solenoid valve is shifted to a second operating position, i.e., changed over to the right side in FIG. 1.

Each of the solenoid valves 31 to 38 is a two ports-two positions solenoid operated changeover valve, and is in its first operating position as shown in FIG. 1 when a current is not fed to its solenoid coil, so that each of the wheel brake cylinders 51 and 52 is communicated with the hydraulic booster 5 provided that the solenoid valves 61, 62 are in the second position, and the wheel brake cylinders 53, 54 are connected with the hydraulic booster 5. When the current is fed to the solenoid coil, each solenoid valve is changed over to its second operating position, so that each of the wheel brake cylinders 51 and 52 is shut off from the communication with the hydraulic booster 5 through the solenoid valves 61, 62, and is communicated with the low pressure reservoir 4 through the solenoid valves 61, 62, and each of the wheel brake cylinders 53, 54 is shut off from the communication with the hydraulic booster 5 through the solenoid valve 63, and is communicated with the low pressure reservoir 4. Other check valves as shown in FIG. 1 permit the brake fluid to return from each of the wheel brake cylinders 51 to 54 to the hydraulic booster 5, and blocks the counterflow of the brake fluid.

Accordingly, with each of the solenoid valves 61 to 63 energized or de-energized, the communication between the wheel brake cylinders 51 to 54 and the master cylinder 2 or the hydraulic booster 5 is changed over. And, with each of the solenoid valves 31 to 38 energized or de-energized, the hydraulic braking pressure in each of the wheel brake cylinders 51 to 54 is decreased, held or increased. Namely, when the current is not fed to the solenoid coil of each of the solenoid valves 31 to 38, the hydraulic braking pressure is supplied from the hydraulic booster 5 to each of the wheel brake cylinders 51 to 54 to increase the hydraulic braking pressure in each wheel brake cylinder. On the other hand, when the current is fed to the solenoid coil, each of the wheel brake cylinders 51 to 54 is communicated with the low pressure reservoir 4 to decrease the hydraulic braking pressure in each wheel brake cylinder. Further, when the current is fed only to the solenoid coils of the solenoid valves 31, 33, 35 and 37, the hydraulic braking pressure in each wheel brake cylinder is held. Accordingly, by adjusting the period for energizing or de-energizing the solenoid valves 31 to 38, a so-called pulse increase mode (i.e., step increase mode), or a pulse decrease mode is provided so as to gradually increase or decrease the hydraulic braking pressure.

The above-described solenoid valves 31 to 38 and solenoid valves 61 to 63 are electrically connected to the electronic controller 10 which controls the operation of those solenoid valves. The electric motor 24 is also electrically connected to the electronic controller 10, so that the operation of the electric motor 24 is controlled by the electronic controller 10. At the wheels FR, FL, RR and RL, there are provided wheel speed sensors 41 to 44 respectively, which are electrically connected to the electronic controller 10, and by each of which a signal corresponding to a rotational speed of each road wheel, i.e., a wheel speed signal is fed to the electronic controller 10. There is also provided a brake switch 45 which turns on when the brake pedal 3 is depressed, and turns off when the brake pedal 3 is released, and which is electrically connected to the electronic controller 10. Further, the pressure sensor 46, low pressure switch 47 and regulated pressure switch 48 are electrically connected to the electronic controller 10.

Figure 2:
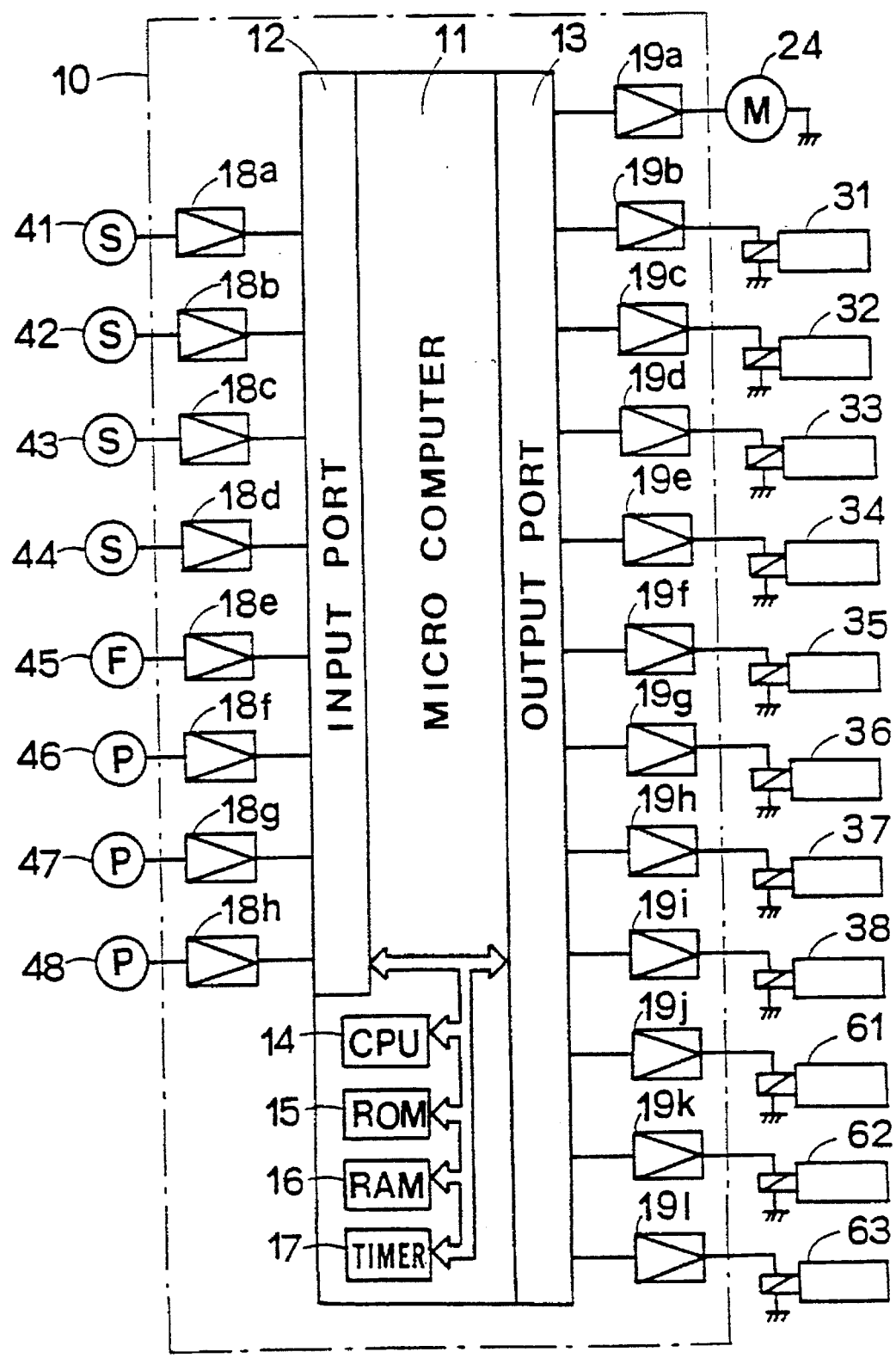
FIG. 2 is a block diagram illustrating the arrangement of the electronic controller shown in FIG. 1.

As shown in FIG. 2, the electronic controller 10 is provided with a one-chip microcomputer 11, which includes a central processing unit or CPU 14, a read-only memory or ROM 15, a random access memory or RAM 16 and a timer 17, which are connected with an input port 12 and an output port 13 via a common bus to execute the input/output operations relative to external circuits. The signals detected by each of the wheel speed sensors 41 to 44, the brake switch 45, the pressure sensor 46, the low pressure switch 47 and the regulated pressure switch 48 are fed to the input port 12 via respective amplification circuits 18a to 18h and then to the CPU 14. Then, a control signal is fed from the output port 13 to the electric motor 24 via a drive circuit 19a, and control signals are fed to the solenoid valves 31 to 38 and solenoid valves 61 to 63 via the respective drive circuits 19b to 19l. In the microcomputer 11, the ROM 15 memorizes a program corresponding to flowcharts shown in FIGS. 3 to 9, the CPU 14 executes the program while the ignition switch (not shown) is closed, and the RAM 16 temporarily memorizes variable data necessary for executing the program.

Figure 3:
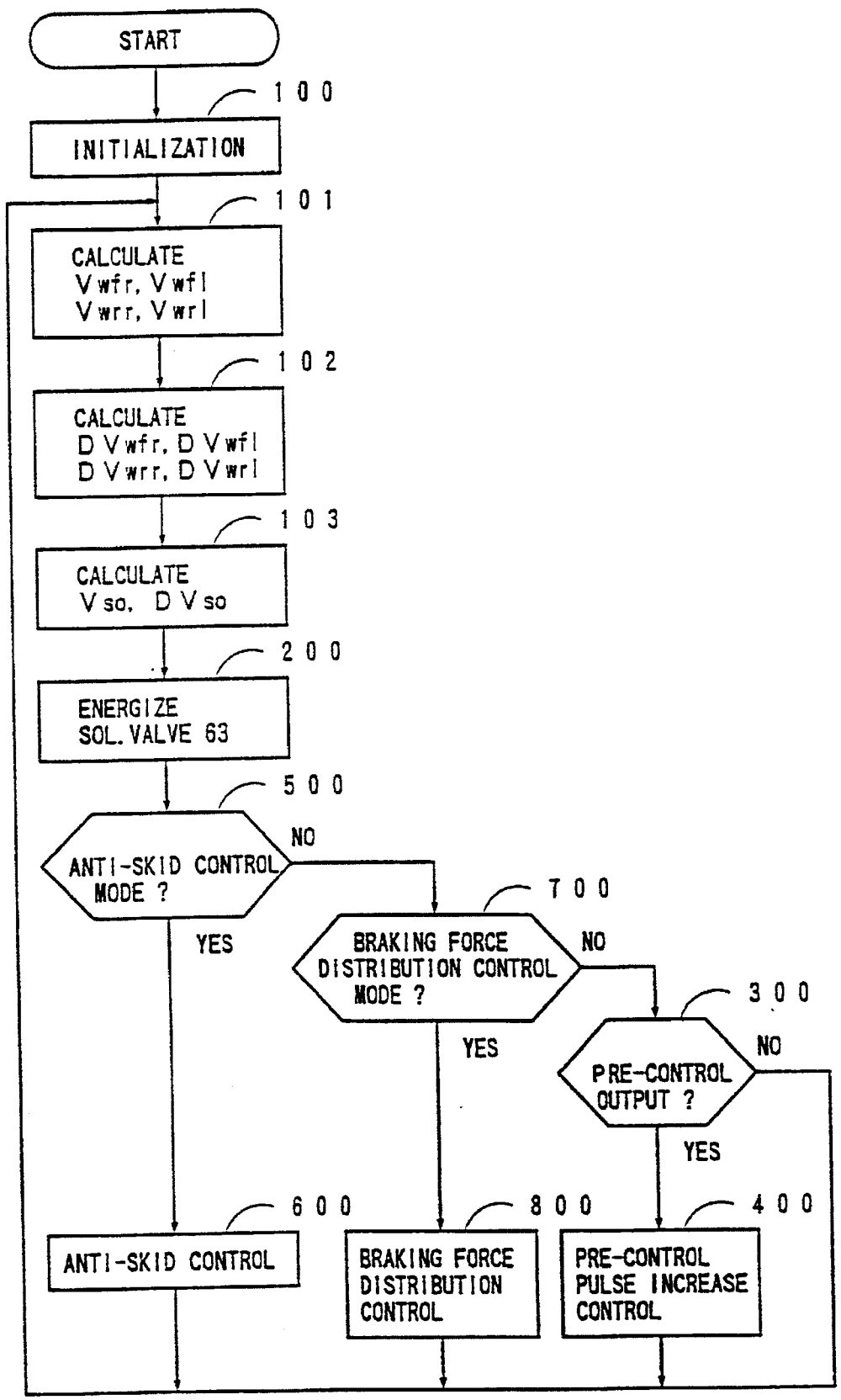
FIG. 3 is a flowchart showing the operation of the braking force control according to an embodiment of the present invention.

The program routine executed by the electronic controller 10 for the braking force distribution control will now be described with reference to FIGS. 3 to 9. FIG. 3 is a flowchart showing a main routine executed in accordance with a program of one embodiment of the present invention. The program routine corresponding to the flowchart as shown in FIG. 3 starts when the ignition switch (not shown) turns on, and provides for initialization of the system at Step 100 to clear various data. Then, the program proceeds to Step 101 where the wheel speeds Vwff, Vwfr, Vwrr, Vwrl are calculated on the basis of output signals from the wheel speed sensors 41 to 44, and these wheel speeds are differentiated to obtain wheel accelerations DVwfr, DVwfl, DVwrr, DVwrl. Alternately, an acceleration sensor may be provided for producing the wheel acceleration signals. And, at Step 103 an estimated vehicle speed Vso is calculated on the basis of the wheel speeds, and as its differential value, a vehicle acceleration DVso is calculated. The estimated vehicle speed Vso corresponds to the value representing a vehicle speed and is calculated as follows. That is, a vehicle speed in braking operation is set to a value calculated on the assumption that the vehicle speed is reduced with a predetermined deceleration from the vehicle speed corresponding to the wheel speed in braking operation, and then, if the wheel speed of any one of four wheels exceeds the wheel speed corresponding to the vehicle speed as set above, the vehicle speed is reset to a value calculated on the assumption that the vehicle speed of the value previously set is reduced with the predetermined deceleration again from the vehicle speed corresponding to the exceeded wheel speed. The estimated vehicle speed Vso is, therefore, the same as that provided for the conventional anti-skid control.

Next, at Step 200, the solenoid valve 63 is energized to be placed in the second operating position on a certain condition where the brake switch 45 turns on with the brake pedal 3 depressed, for example, so that the wheel brake cylinders 53, 54 are blocked from the communication with the master cylinder 2, and communicated with the hydraulic booster 5. Then, the program proceeds to Step 500, where it is determined whether the condition for initiating the anti-skid control operation is fulfilled or not. If it is determined that the condition is fulfilled to be in the anti-skid control mode, the solenoid valves 61, 62 are shifted to the second operating positions and the solenoid valves 31 to 38 are actuated to perform the anti-skid control operation at Step 600. If it is determined not to be in the anti-skid control mode at Step 500, then the program proceeds to Step 700 where it is determined whether the braking force distribution control mode is to be selected. If it is affirmative at Step 700, the program further proceeds to Step 800, otherwise it proceeds to Step 300. Whether the braking force distribution control mode is to be selected or not is determined on the basis of various conditions of the vehicle in the braking condition. For example, it is determined to initiate the braking force distribution control, provided that all the conditions are fulfilled, such that the anti-skid control system is normal, that the braking force distribution control system is normal, that the rear wheels RR, RL are not under the anti-skid control, and that the solenoid valve 63 is energized. Then, the program proceeds to Step 800 where the braking force distribution control is executed, and thereafter the program returns to Step 101.

At Step 300, it is determined whether a certain braking operation has been made or not. That is, after the brake pedal 3 was depressed, the wheel speed Vwfr (Vwfl) of the front wheel FR (FL) is decreased to be lower than the estimated vehicle speed Vso, and the wheel acceleration DVw, which is a differential value of the wheel speed, becomes lower than a predetermined acceleration (including deceleration) G1, then it is determined that a pre-control output is to be permitted, so that the program proceeds to Step 400 where a pre-control pulse increase control is initiated, otherwise it returns to Step 101. The pre-control pulse increase control has been employed in the prior anti-skid control system, in such a manner that the solenoid valves 31, 33, 35, 37 are energized or de-energized to repeat the holding operation and increasing operation of the hydraulic braking pressure. Therefore, it is also called as a pre-control hold control. After the pre-control pulse increase control is terminated, the program returns to Step 101.

In the above-described operation, a fail-safe function is provided. That is, when some abnormality is found in the braking force distribution control system, the solenoid valve 63 will be de-energized to return to its first operating position as shown in FIG. 1, and the solenoid valves 35, 37 will be placed in their open positions, so that the wheel brake cylinders 53, 54 will be communicated with the master cylinder 2 through the proportioning valve 6. Consequently, the rear wheels RR, RL are applied with the braking force determined on the basis of the braking force distribution provided as in the prior art.

Figure 4:
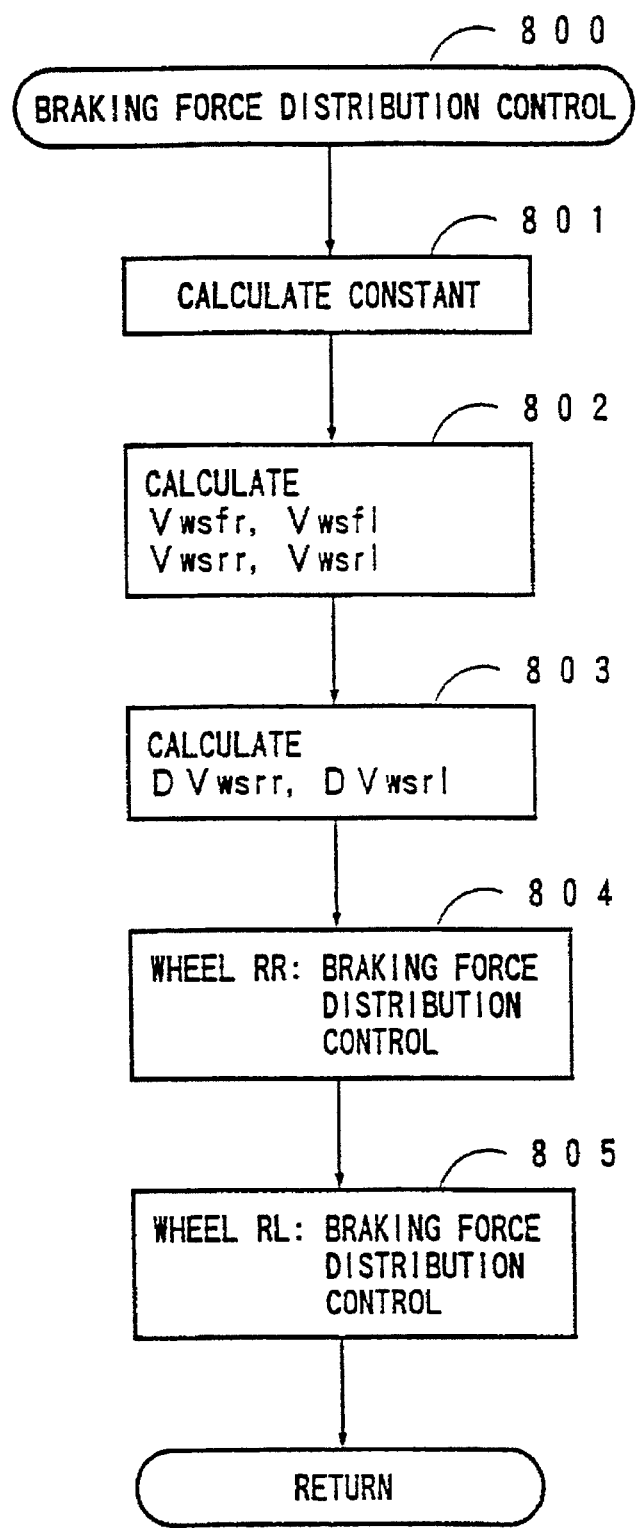
FIG. 4 is a flowchart showing the operation of the braking force distribution control according to an embodiment of the present invention.

The braking force distribution control in Step 800 is executed according to a flowchart as shown in FIG. 4, wherein various constants for determining the starting condition of the braking force distribution are set at Step 801 which will be described later in detail with reference to FIG. 8. Then, at Step 802, standard speeds Vwsfr, Vwsfl, Vwsrr, Vwsrl are calculated on the basis of the wheel speeds Vwfr, Vwfl, Vwrr, Vwrl of the wheels FR, FL, RR, RL by a predetermined operation which will be described later with reference to FIG. 7. The differences between the standard speeds of the front and rear wheels (Vwsrr−Vwsfr), (Vwsrl−Vwsfl) are calculated at Step 803 to provide the standard speed differences DVwsrr, DVwsrl, respectively. Then, the program proceeds to Steps 804, 805 where the braking force distribution control for the rear wheels RR, RL are executed.

Figure 5:
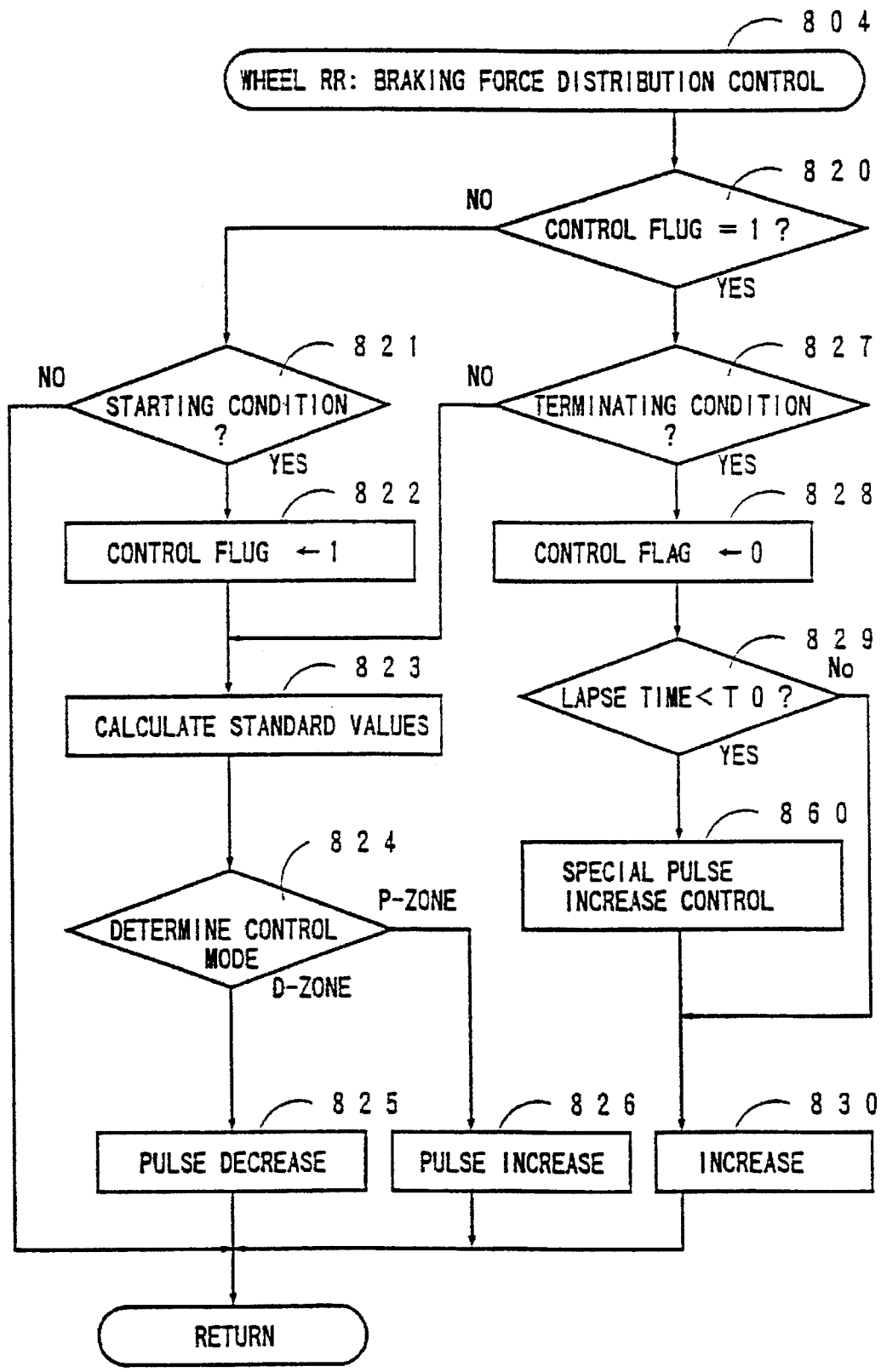
FIG. 5 is a flowchart showing the operation of the braking force distribution control of the rear right wheel according to an embodiment of the present invention.

FIG. 5 shows a subroutine of Step 804 in FIG. 4 with respect to the braking force distribution control for the rear wheel RR, which will be described hereinafter, and the braking force distribution control for the rear wheel RL will be executed as well. At the outset, it is determined at Step 820 whether the braking force distribution control has been already initiated. If a control flag representing that the distribution control has been initiated is not set (i.e., "0"), then the program proceeds to Steps 821 to 826, and if it is set (i.e., "1"), the program proceeds to Steps 827 to 830.

At Step 821, the initiation of the braking force distribution control with respect to the wheel RR is determined. As for the starting condition, there are provided various conditions, such that the standard speed Vwsrr of the rear wheel RR, for example, is in a certain relationship with the standard speed Vwsfr of the front wheel FR, that the standard acceleration DVso is less than a predetermined value, e.g., −0.25 G (G: gravitational acceleration), that the brake switch 45 is in its ON condition, and that the estimated vehicle speed Vso is greater than a predetermined speed, e.g., 15 km/h. The determination of the starting condition will be described later in detail with reference to FIG. 8. With all the conditions fulfilled, it is determined that the braking force distribution control may be initiated, so that the control flag is set to "1" at Step 822, and the program further proceeds to Step 823. Otherwise, the program returns to the routine in FIG. 4.

At Step 823, a slip rate Sprr or the like is calculated on the basis of the aforementioned standard speed Vwsrr or the like, and control standard values Tsrr, Dfrr are calculated. The control standard value Dfrr is a variation of the standard speed difference DVwsrr, or a difference between the value in the previous cycle and the value in the present cycle, DVwsrr(n)−DVwsrr(n−1). The slip rate Sprr is a slip rate of the standard speed Vwsrr of the rear right wheel RR with respect to the standard speed Vwsfr of the front right wheel FR, (Vwsrr−Vwsfr)/Vwsfr, which is integrated to provide a value ISprr. Then, the control standard value Tsrr is calculated from a function (Sprr, Dfrr, ISprr).

Figure 10:
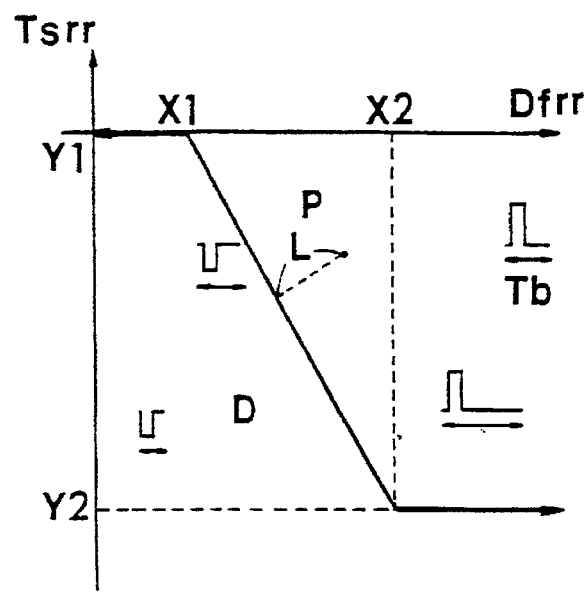
FIG. 10 is a diagram showing a control map for the braking force distribution of the rear right wheel according to an embodiment of the present invention.

On the basis of the control standard values Tsrr, Dfrr, a control map is formed as shown in FIG. 10, and the control mode is determined at Step 824 in accordance with the control map. In FIG. 10, the ordinate represents the control standard value Tsrr which is obtained by adding the slip rate Sprr and the integrated value ISprr according to this embodiment, while the abscissa represents the control standard value Dfrr. There are provided two zones of P-zone and D-zone, which are divided by a line segment for connecting an intersection of X1 (G) and Y1 (%) with an intersection of X2 (G) and Y2 (%), and a line segment parallel with the X-axis (i.e., abscissa). The P-zone represents a zone where the pulse increase control mode is selected, while the D-zone represents a zone where the pulse decrease control mode is selected. In each zone, a period Tb and on-time are set for each control pulse signal. The period Tb is calculated in accordance with the following formula:

$$Tb=Kb-Kc\times L$$

where L corresponds to a length of a perpendicular from a random point to the line segment connecting the intersection (X1, Y1) with the intersection (X2, Y2) as shown in FIG. 10, and Kb, Kc are constants. "x" represents multiplication. Accordingly, in response to that control pulse signal, the pulse decrease control or pulse increase control are executed at Step 825 or Step 826 in FIG. 5, respectively.

Referring back to Step 820, if it is determined that the control flag is set to "1", then it is determined at Step 827 whether the terminating condition has been fulfilled or not. For the terminating condition, there are provided various conditions, such that the brake switch 45 turns off, and that the standard acceleration DVso exceeds the predetermined value (−0.25 G). If either one of those conditions is fulfilled, it is determined that the braking force distribution control may be terminated. Consequently, the control flag is reset to "0" at Step 828 and the program proceeds to Step 829. If the terminating condition is not fulfilled, the program proceeds to Step 823 and the braking force distribution control is continued.

At Step 829 is determined a lapse time after the control flag was reset (hereinafter, simply referred to as a lapse time). If it is determined that the lapse time is equal to or greater than the predetermined time T0, the program proceeds to Step 830, where a normal increase control is executed. If it is determined that the lapse time is less than the predetermined time T0, the program proceeds to Step 860, where a special pulse increase control is executed, and then proceeds to Step 830. The special pulse increase control will be explained later in detail with reference to FIG. 9.

Figure 6:
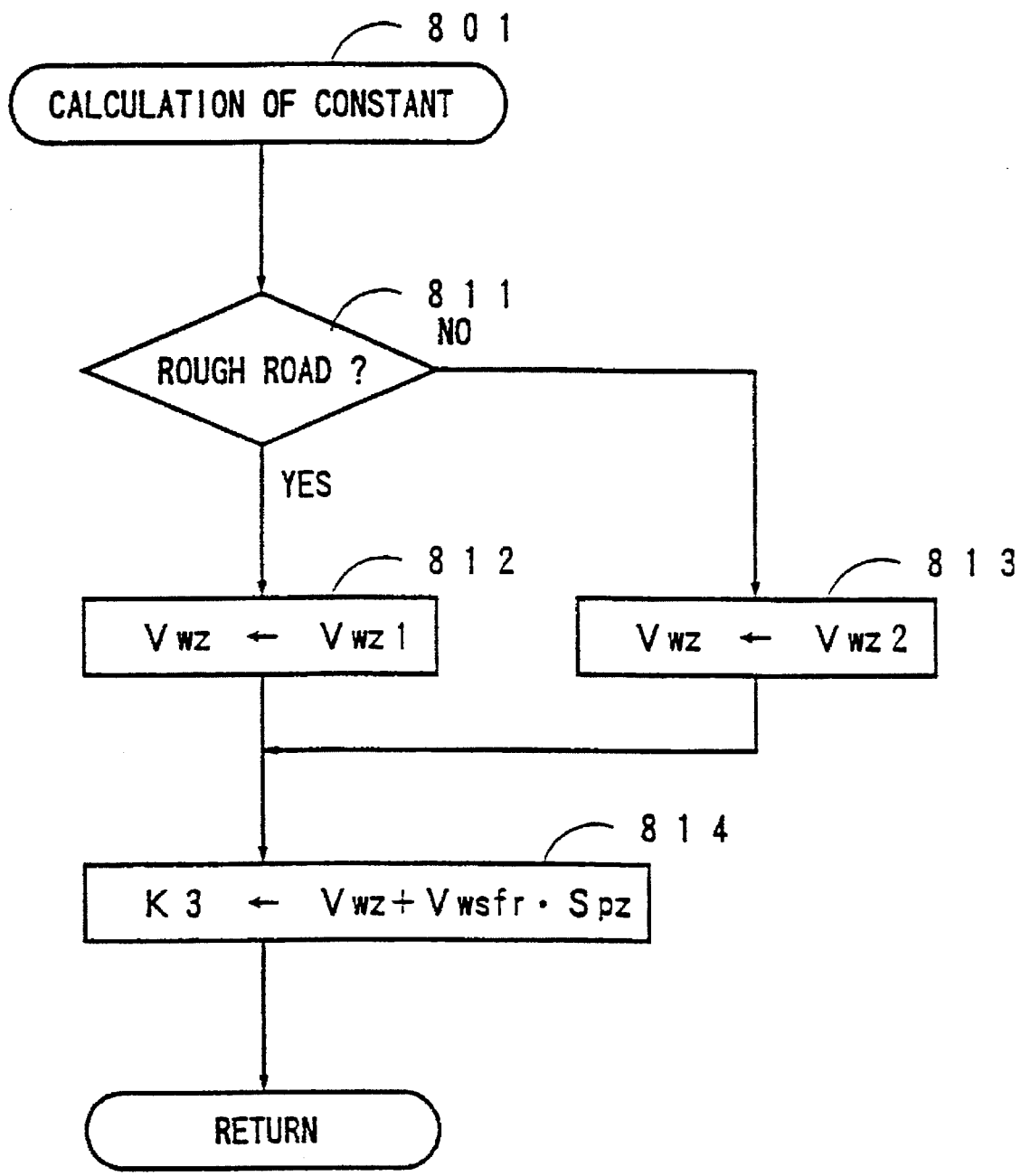
FIG. 6 is a flowchart showing the calculation of constant for the braking force distribution control according to an embodiment of the present invention.

Referring to FIG. 6, the calculation of constant executed at Step 801 in FIG. 4 for varying the starting condition of the braking force distribution control in response to a running road condition will be explained hereinafter. At the outset, if it is determined at Step 811 that the vehicle is running on a rough road, a first set value Vwz1 is set for a bias speed Vwz at Step 812. Otherwise, a second set value Vwz2 (less than Vwz1) is set for the bias speed Vwz. The determination of the rough road executed at Step 811 is the same as the determination of the road condition executed for the anti-skid control in the prior art. For example, the road condition of the running road is determined in response to the number of times which the wheel acceleration exceeded a predetermined value within a certain period of time, as described in Japanese Laid-open Publication No. 3-284463, the disclosure of which is incorporated by reference in its entirety. Then, at Step 812, the bias speed Vwz is added to the slip rate bias speed (Vwsfr×Spz) to provide a constant K3 (=Vwz+Vwsfr×Spz). "Spz" represents a slip rate of the standard speed Vwsrr with respect to the standard speed Vwsfr.

Figure 7:
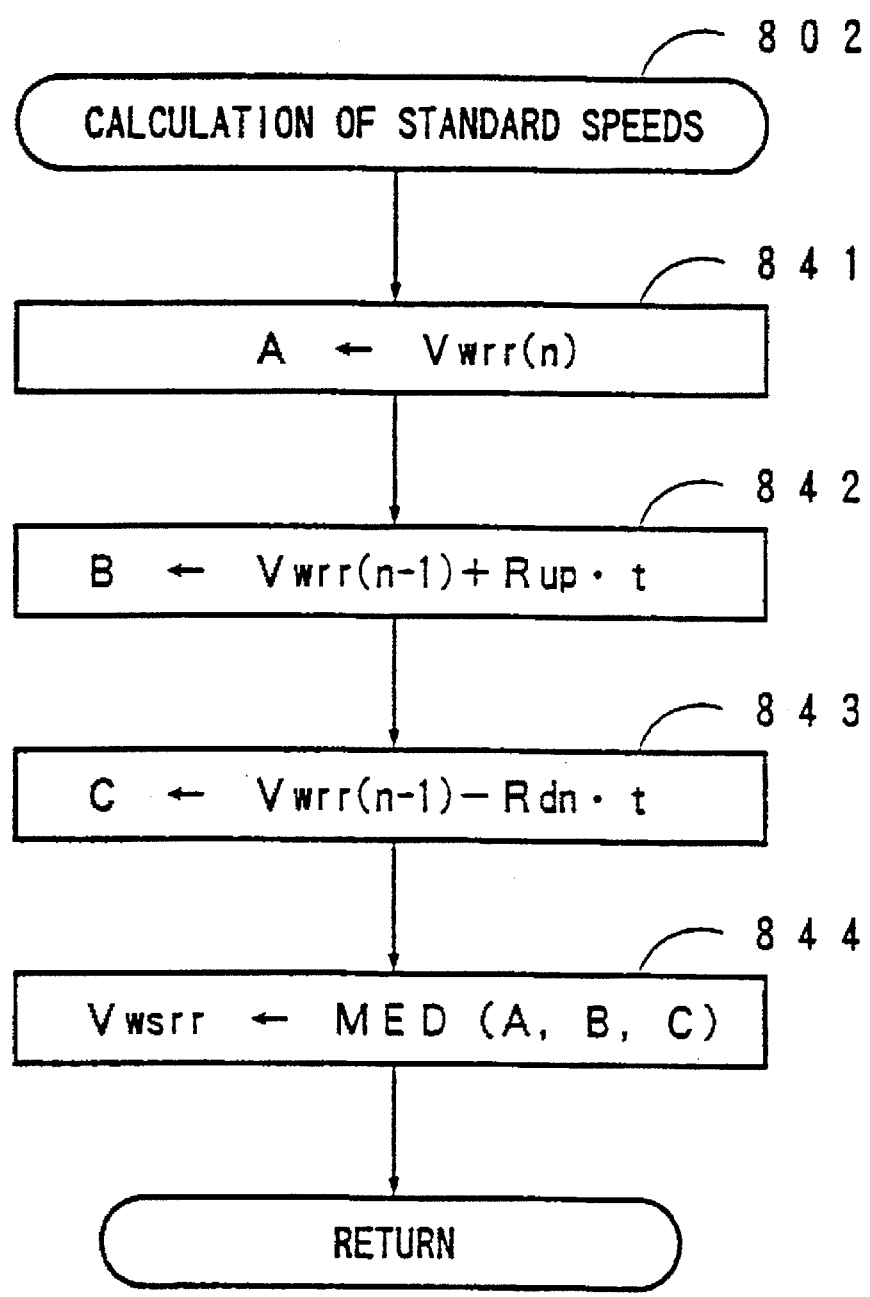
FIG. 7 is a flowchart showing the calculation of standard speeds for the braking force distribution control according to an embodiment of the present invention.

Referring next to FIG. 7, the calculation of the standard speeds executed at Step 802 in FIG. 4 will be described with respect to the rear right wheel RR. The standard speeds for the remaining wheels of the vehicle will be calculated in the same manner as described below. The wheel speed Vwrr of the wheel RR calculated at Step 101 is stored sequentially in the memory at a predetermined operation period, the value Vwrr(n) in the present cycle (n) is set for a value A at Step 841. Next, a predetermined value (Rup×t) is added to the value Vwrr(n−1) in the previous cycle (n−1) to provide a value B at Step 842. Then, a predetermined value (Rdn×t) is subtracted from the previous value Vwrr(n−1) to provide a value C at Step 843. Thereafter, a medium value of the values A, B and C is selected at Step 844 to provide the standard value Vwsrr. "Rup" is a value for setting a limitation of an acceleration of the wheel speed Vwrr, or an increasing rate of the wheel speed Vwrr, and set to 2 G (G: gravitational acceleration), for example. "t" is an operation period of a calculation cycle which is set to 10 msec, for example. "Rdn" is a value for setting a limitation of a deceleration of the wheel speed Vwrr, or a decreasing rate of the wheel speed Vwrr. In the present embodiment, "Rdn" is set to a total value of the acceleration DVwrr and a value (R1) of its certain rate (i.e., Rdn=DVwrr+R1), wherein the value R1 is set to a value corresponding to 25% of the acceleration DVwrr, for example. In the vehicle which is provided with the acceleration sensor (not shown), however, "Rdn" is set to a total value of a value G0 detected by the acceleration sensor and a correction value R0 (i.e., Rdn= G0+R0).

Figure 8:
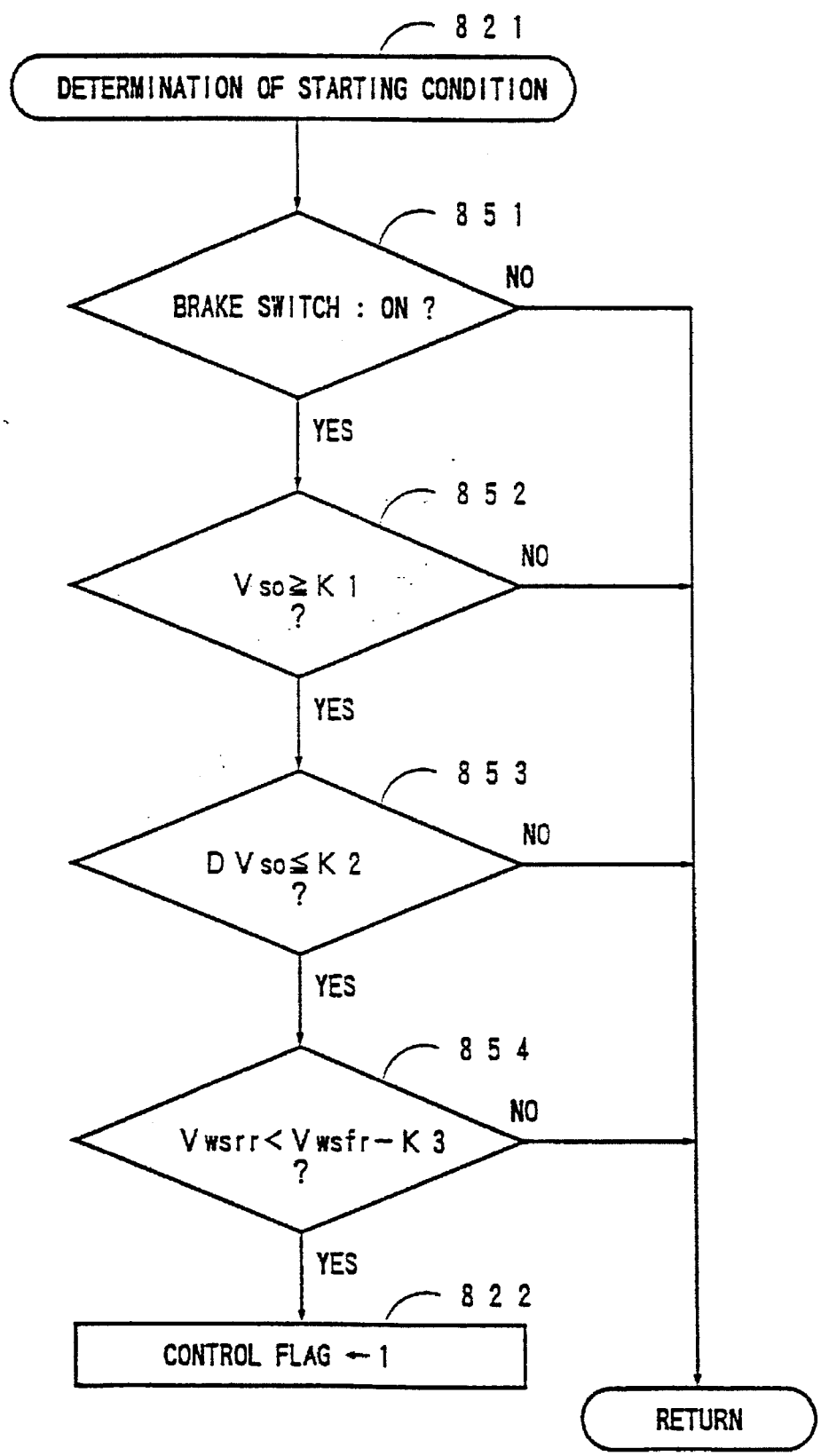
FIG. 8 is a flowchart showing the determination of starting condition for the braking force distribution control according to an embodiment of the present invention.

FIG. 8 shows an example for the determination of the starting condition for the braking force distribution control executed at Step 821 in FIG. 5. It is determined at Step 851 whether the brake switch 45 is in its ON condition. If it is in its ON condition, the program proceeds to Step 852, otherwise it proceeds to the next routine as the starting condition is not fulfilled. At Step 852, the estimated vehicle speed Vso is compared with a predetermined speed K1 (e.g., 15 km/h). If the former (Vso) is equal to or greater than the latter (K1), the program proceeds to Step 853, otherwise it is determined that the starting condition is not fulfilled. Next, at Step 853, the acceleration DVso is compared with a predetermined acceleration K2 (e.g., −0.25 G). If the former (DVso) is equal to or smaller than the latter (K2), the program proceeds to Step 854, while if the former exceeds the latter, it is determined that the starting condition is not fulfilled. Further, at Step 854, the standard speed Vwsrr of the wheel RR is compared with a predetermined standard value (Vwsfr−K3). "K3" corresponds to the constant K3 which is calculated at Step 814 in FIG. 6. If the former (Vwsrr) is less than the latter, it is determined that the starting condition is fulfilled, so that the control flag is set to "1" at Step 822. Otherwise, it is determined that the starting condition is not fulfilled.

Figure 9:
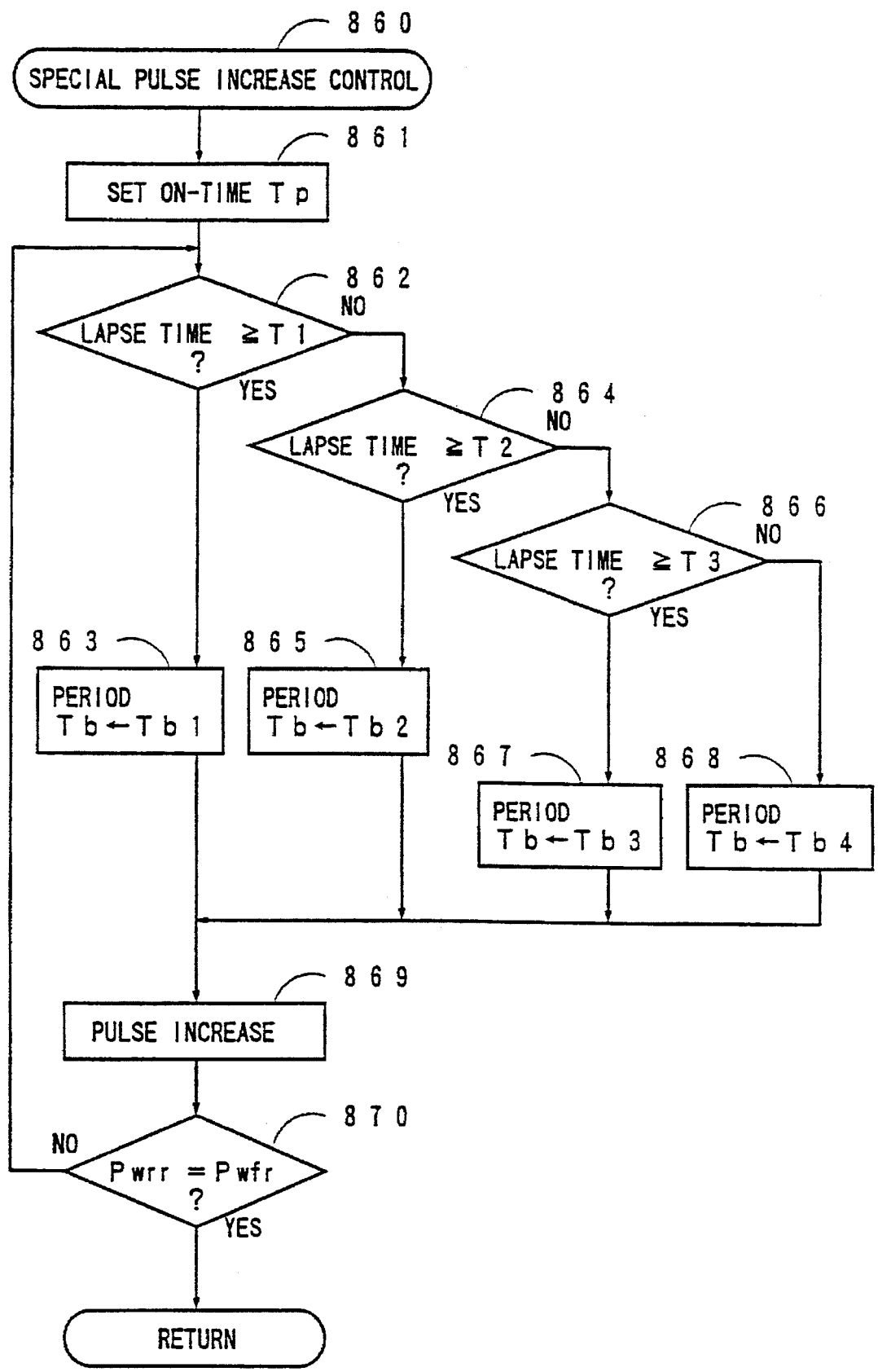
FIG. 9 is a flowchart showing the operation of the special pulse increase control for the braking force distribution control according to an embodiment of the present invention.

Referring to FIG. 9, the special pulse increase control executed at Step 860 in FIG. 5 will be described hereinafter. At the outset, the on-time Tp of the control pulse signal, which is provided for increasing the hydraulic braking pressure in the wheel brake cylinder 53, is set to a predetermined time (e.g., 6 msec). Then, the program proceeds to Step 862, where the lapse time is compared with a predetermined time T1 (less than T0). If it is determined that the lapse time is equal to or greater than the time T1, the period Tb is set to Tb1 (e.g., 16 msec) at Step 863, whereas if it is less than the time T1, the program proceeds to Step 864. Similarly, at Step 864 the lapse time is compared with a predetermined time T2 (less than T1). If it is determined that the lapse time is equal to or greater than the time T2, the period Tb is set to Tb2 (e.g., 32 msec) at Step 865, whereas if it is less than the time T2, the program proceeds to Step 866. At Step 866, the lapse time is further compared with the predetermined time T3 (less than T2). If it is determined that the lapse time is equal to or greater than the time T3, the period Tb is set to Tb3 (e.g., 64 msec) at Step 867. If it is less than the time T3, the period Tb is set to Tb4 (e.g., 128 msec) at Step 868. Then, the program proceeds to Step 869, where the pulse increase control is executed on the basis of the control pulse signal with the on-time Tp and the period Tb, so that the period Tb is gradually decreased with the lapse time increased, to thereby increase the increasing rate of the hydraulic braking pressure. Accordingly, if it is determined at Step 870 that the hydraulic braking pressure Pwrr in the wheel brake cylinder 53 of the rear right wheel RR is equal to the hydraulic braking pressure Pwfr in the wheel brake cylinder 51 of the front right wheel FR, then the program proceeds to Step 830 in FIG. 5. If the pressure Pwrr has not reached the pressure Pwfr, the program returns to Step 862 and the above-described operation will be repeated. While the on-time Tp has been set to a constant value in the present embodiment, it may be of variable values such as the period Tb.

Figure 11:
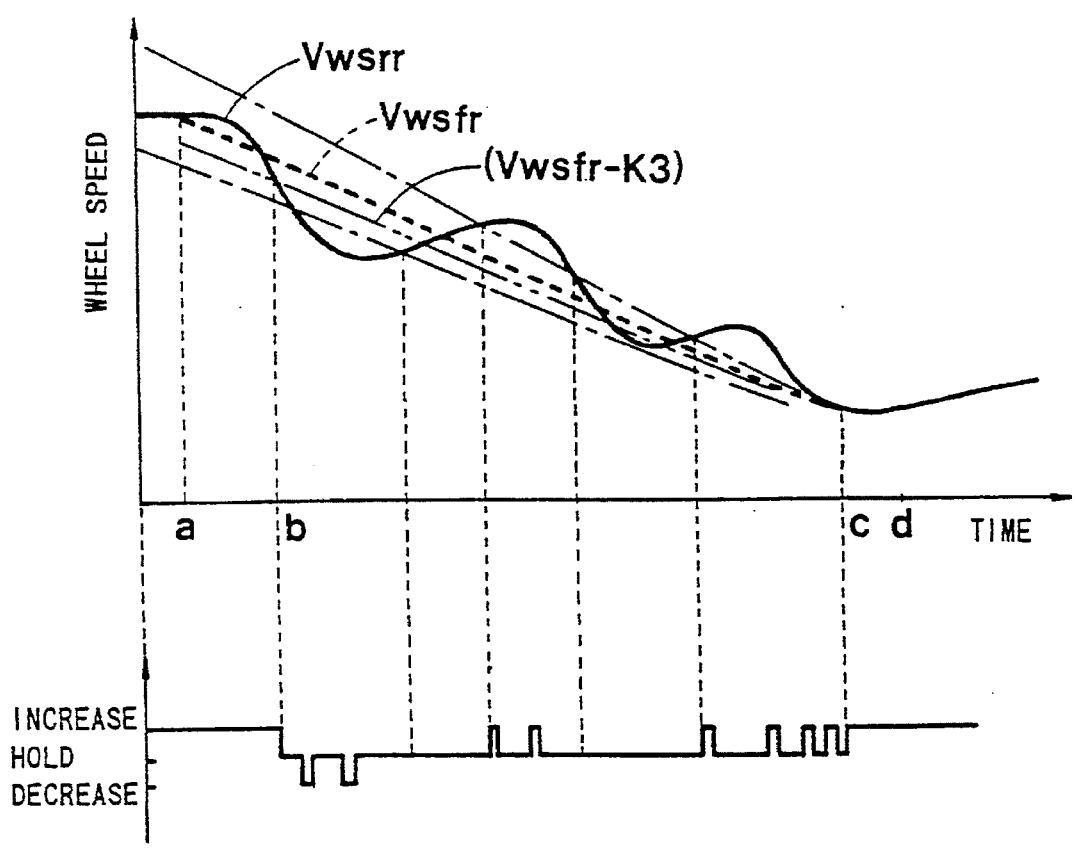
FIG. 11 is a diagram showing the variation of wheel speed of the rear right wheel according to an embodiment of the present invention.
Figure 13:
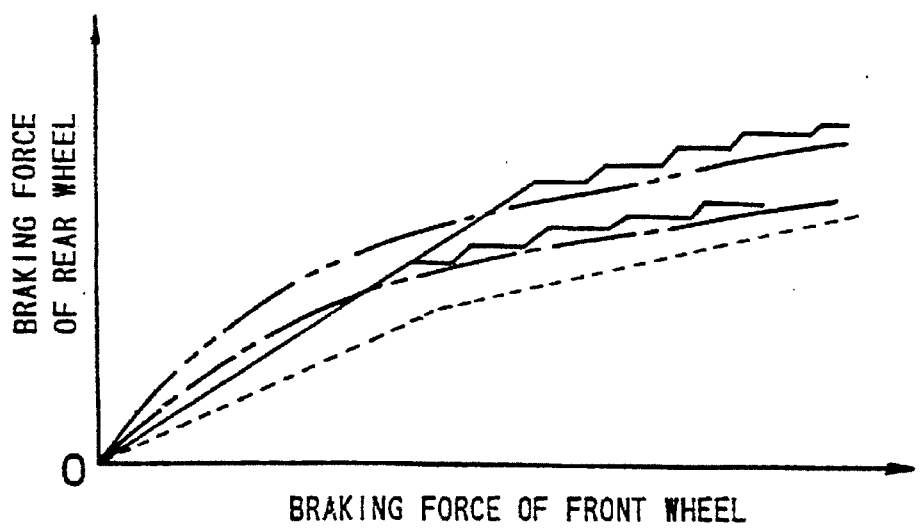
FIG. 13 is a diagram showing the braking force distribution operation in an embodiment of the present invention comparing with a prior art.

FIG. 11 illustrates the variation of the wheel speed of the rear right wheel RR in comparison with that of the front right wheel FR according to the present embodiment. In FIG. 11, the brake pedal 3 is depressed at a position "a", so that the standard speed Vwsrr begins to be decreased. When the standard speed Vwsrr becomes lower than the standard value (Vwsfr−K3) as indicated by a two-dotted chain line at a position "b", the braking force distribution control for the wheel RR is initiated to start the operation for limiting the hydraulic braking pressure in the wheel brake cylinder 53. When the standard speed Vwsrr exceeds the upper standard value as indicated by the one-dotted chain line, for example, the pulse increase operation starts with respect to the wheel brake cylinder 53. Thus, a zone defined between the upper and lower one-dotted chain lines serves as an insensitive zone, whereby a stable control operation is ensured without being affected by disturbance or noise. In FIG. 11, the distribution control is terminated at a point "c", and the brake pedal 3 is released at a point "d". Consequently, the braking force applied to the vehicle with or without the load is controlled to trace the ideal braking force distribution characteristic, as indicated by solid lines in FIG. 13.

Figure 12:
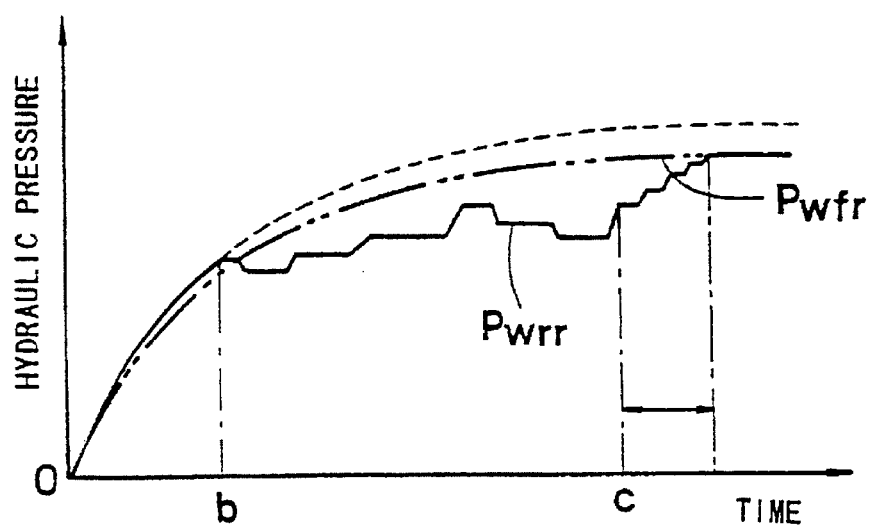
FIG. 12 is a diagram showing the variations of hydraulic pressure in rear and front wheel brake cylinders according to an embodiment of the present invention.

FIG. 12 illustrates the relationship between the hydraulic braking pressures Pwfr, Pwrr of the wheel brake cylinders 51, 53 when the braking force distribution control is executed with respect to the wheel RR. The positions "b" and "c" correspond to the positions "b" and "c" in FIG. 11, respectively. During the period as indicated by an arrow in FIG. 12 after the braking force distribution control was terminated at the position "c", the special pulse increase control is executed in accordance with the flowchart as shown in FIG. 9, whereby the increasing rate of the hydraulic braking pressure will be increased in accordance with the lapse time after the termination of the distribution control. As described before, this special control is arranged to be terminated when the pressure Pwrr in the wheel brake cylinder 53 becomes equal to the pressure Pwfr in the wheel brake cylinder 51, and shifted to the normal increase control. That is, even if the pressure Pwrr was set on the basis of the on-time Tp and the period Tb to exceed the pressure Pwfr in the wheel brake cylinder 51, it is so controlled that when the pressure Pwrr becomes equal to that of the pressure Pwfr, the special pulse increase control will be terminated. Thus, the hydraulic braking pressure in the rear wheel brake cylinder 53 is not increased rapidly after the termination of the braking force distribution control, but gradually increased up to the hydraulic braking pressure in the front wheel brake cylinder 51, to thereby provide a smooth braking operation for a transitional period to the normal braking operation.

Figure 14:
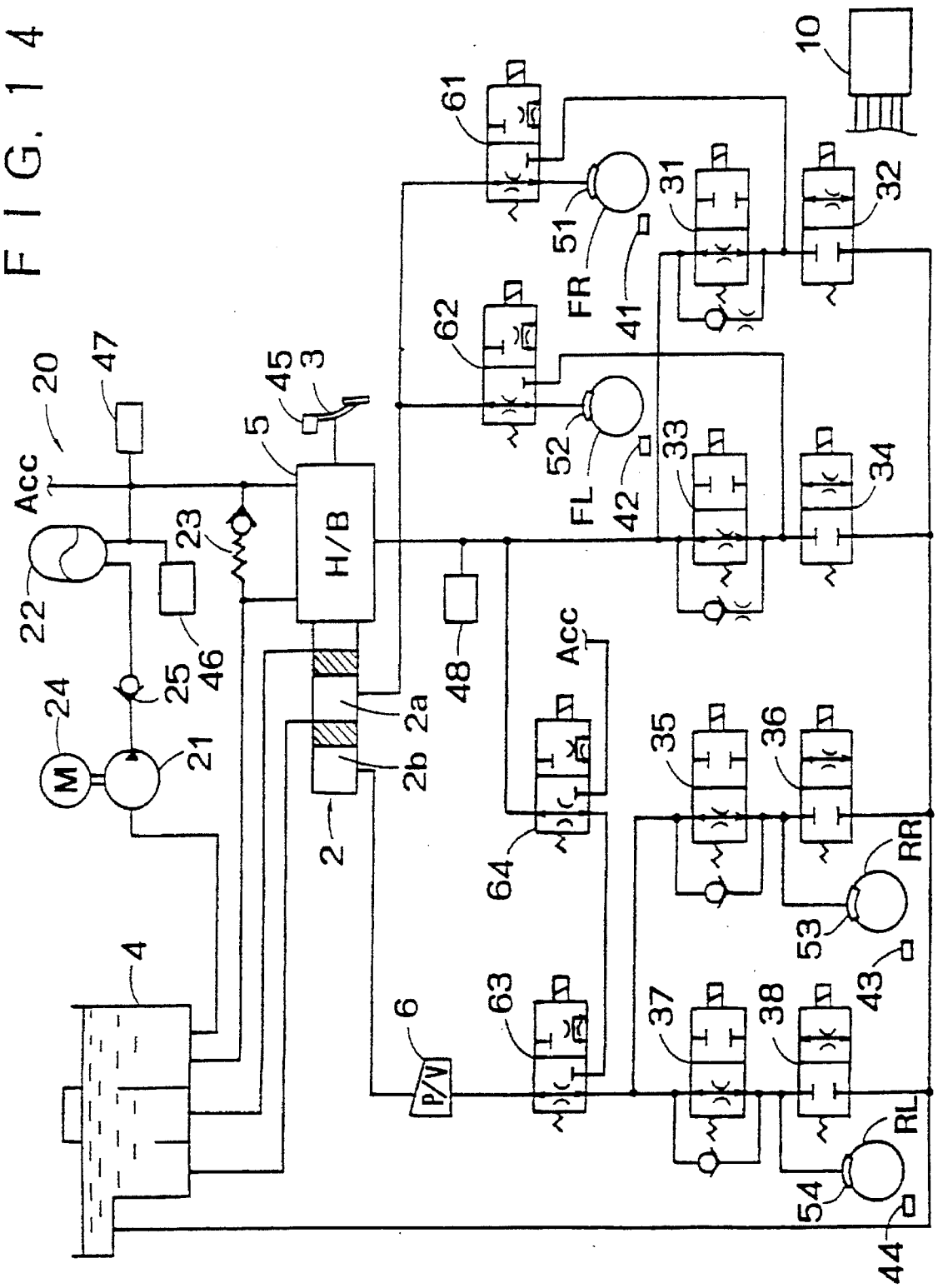
FIG. 14 is a general block diagram illustrating a braking force distribution control system according to another embodiment of the present invention.

FIG. 14 illustrates another embodiment of the present invention, which further includes a solenoid valve 64 in the embodiment as shown in FIG. 1, to provide a so-called traction control function. That is, in the hydraulic circuit connecting the hydraulic booster 5 with the solenoid valve 63 in FIG. 1, a solenoid valve 64 of three ports-two positions electromagnetic changeover valve is disposed, and its one port is connected to the output side of the accumulator 22. The solenoid valve 64 is placed in a first operating position as shown in FIG. 14 when its solenoid coil is de-energized, to connect the solenoid valve 63 with the hydraulic booster 5 and block the communication between the valve 63 and the accumulator 22. When the solenoid valve 64 is energized, it is shifted to its second operating position where the communication between the solenoid valve 63 and the hydraulic booster 5 is blocked, and the solenoid valve 63 is communicated with the accumulator 22.

Accordingly, during the normal braking operation, the solenoid valve 63 is placed in the second operating position, and communicated with the hydraulic booster 5 through the solenoid valve 64 which is placed in the first operating position, so that the wheel brake cylinders 53, 54 can be communicated with the hydraulic booster 5 through the solenoid valves 35, 37, 63 and 64. When an acceleration slip is detected with respect to the wheels RR, RL of driven wheels, the solenoid valve 64 is shifted to its second operating position, whereby the wheel brake cylinders 53, 54 can be directly communicated with the accumulator 22. Then, the solenoid valves 35 to 38 are actuated in accordance with the slip conditions of the wheels RR, RL, so that the braking force is applied to the wheels RR, RL to thereby prevent them from rotating extraordinarily. When the brake pedal 3 is depressed to start braking operation and the braking force distribution control is executed, the solenoid valve 64 is placed to its first operating position.

The operation of the solenoid valves 63, 64 will now be explained sequentially. First of all, in the stopped condition or abnormal condition, both of the solenoid valves 63, 64 are de-energized, and the aforementioned braking force distribution control is not executed, but the hydraulic braking pressure in the wheel brake cylinders 53, 54 are regulated by the proportioning valve 6. During the anti-skid control operation, the solenoid valve 63 is energized, while the solenoid valve 64 is de-energized, so that the hydraulic pressure is fed from the hydraulic booster 5 to the wheel brake cylinders 53, 54. During the traction control operation, both of the solenoid valves 63, 64 are energized, so that the power pressure is fed from the accumulator 22 to the wheel brake cylinders 53, 54. And, during the normal braking operation, the solenoid valve 64 is de-energized, while the solenoid valve 63 is energized, so that the regulated pressure is fed from the hydraulic booster 5 to the wheel brake cylinders 53, 54 and the aforementioned braking force distribution control is executed. Those controls are arranged to be executed according to priority, such as the response to an abnormal operation to be executed at first, next the anti-skid control, then the braking force distribution control, and then the pre-control pulse increase control, and the traction control at last.

Figure 15:
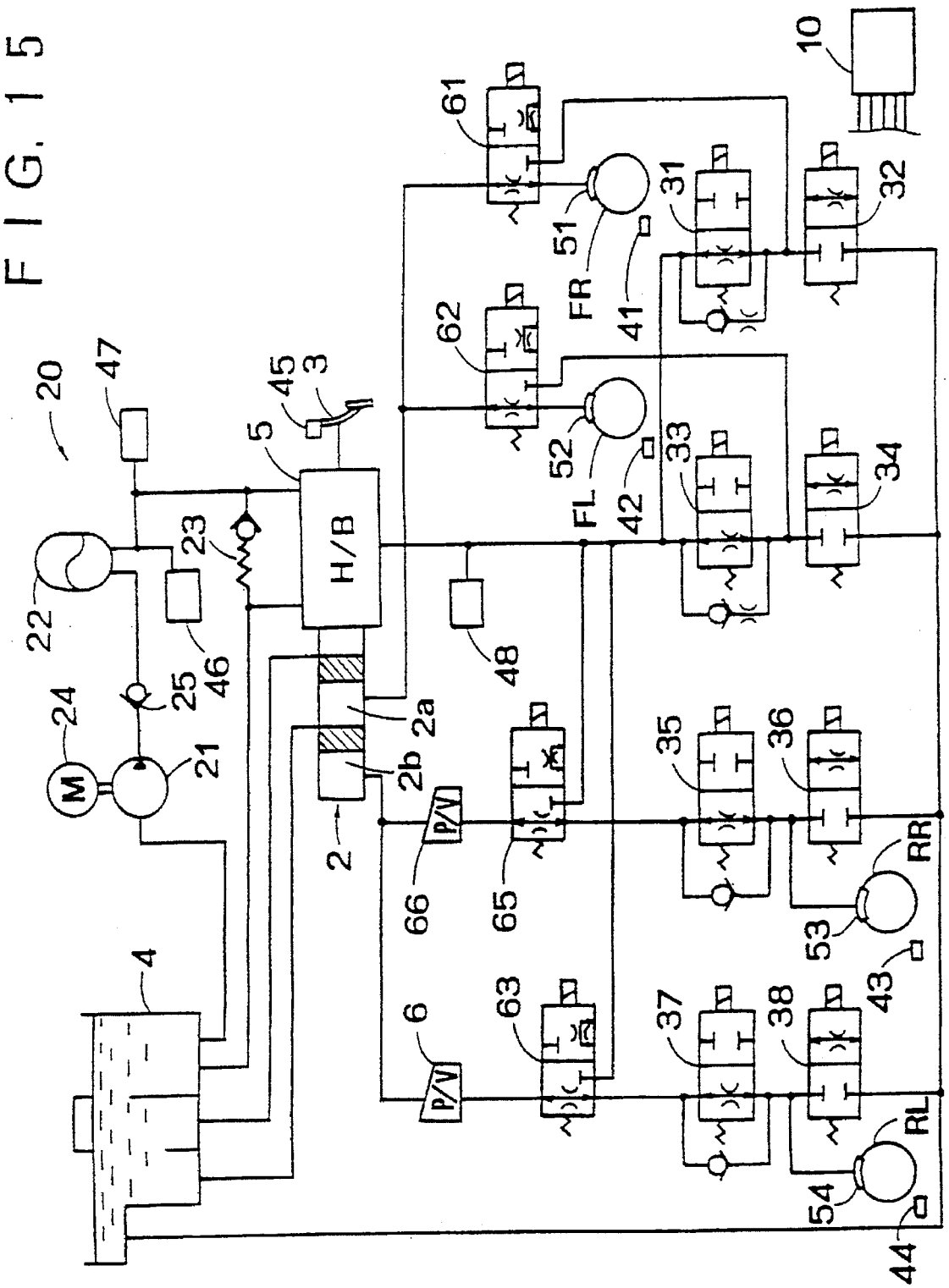
FIG. 15 is a general block diagram illustrating a braking force distribution control system according to a further embodiment of the present invention.

FIG. 15 illustrates a further embodiment of the present invention, wherein a front and rear dividing hydraulic circuit system is employed, so that the rear wheels RR, RL can be controlled independently of each other. That is, a solenoid valve 65 of a three ports-two positions electromagnetic changeover valve and a proportioning valve 66 are provided in addition to the arrangement as shown in FIG. 1. According to the present embodiment, therefore, the wheels RR, RL can be controlled separately. The remaining arrangement is substantially the same as that disclosed in FIG. 1, so that its explanation will be omitted. If two more sets of the three ports-two positions electromagnetic changeover valve corresponding to the solenoid valve 65 as shown in FIG. 14 are provided in the embodiment illustrated in FIG. 15, then the traction control function may be added such as the embodiment in FIG. 14.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A braking force distribution control system for controlling a braking force applied to a pair of rear wheels of an automotive vehicle in a certain relationship with a braking force applied to a pair of front wheels of said automotive vehicle, comprising:

a pair of front wheel brake cylinders, each of which is operatively connected to a respective one of said front wheels for applying a braking force to the respective front wheel;

a pair of rear wheel brake cylinders, each of which is operatively connected to a respective one of said rear wheels for applying a braking force to the respective rear wheel;

a reservoir for storing brake fluid;

a master cylinder for pressurizing the brake fluid fed from said reservoir and supplying hydraulic braking pressure to said pair of front wheel brake cylinders in response to depression of a brake pedal;

an auxiliary power source communicated with said reservoir for pressurizing the brake fluid fed from said reservoir and discharging a power pressure;

dynamic hydraulic braking pressure regulating means communicated with said auxiliary power source for regulating said power pressure to a pressure regulated in a certain relationship with the hydraulic braking pressure discharged from said master cylinder in response to depression of said brake pedal;

pressure control valve means disposed in respective hydraulic circuits communicating said regulating means with said rear wheel brake cylinders for controlling the hydraulic braking pressure in said rear wheel brake cylinders; and control means for actuating said valve means to control the hydraulic braking pressure in said rear wheel brake cylinders in a certain relationship with the hydraulic braking pressure in said front wheel brake cylinders.

2. A braking force distribution control system according to claim 1, wherein said regulating means comprises a hydraulic booster for actuating said master cylinder by said regulated pressure.

3. A braking force distribution control system according to claim 1, further comprising:

wheel speed detection means for detecting wheel speeds of said front wheels and said rear wheels;

comparison means for comparing the wheel speeds of said front wheels and said rear wheels detected by said wheel speed detection means, said control means actuating said pressure control valve means in response to a result of the comparison made in said comparison means to control the hydraulic braking pressure in said rear wheel brake cylinders in a certain relationship with the hydraulic braking pressure in said front wheel brake cylinders;

termination determining means for determining a certain condition for terminating the control of the hydraulic braking pressure by said control means; and pulse increase control means for providing a pulse increase mode to repeat holding and increasing operations of the hydraulic braking pressure in said rear wheel brake cylinders, wherein said pulse increase control means provides a special pulse increase mode to increase the hydraulic braking pressure in said rear wheel brake cylinders at an increasing rate raised in accordance with a lapse of time after said termination determining means determines said terminating condition has been fulfilled.

4. A braking force distribution control system according to claim 3, wherein said pulse increase control means provides a pulse signal having a period that varies in accordance with said lapse of time.

5. A braking force distribution control system according to claim 4, wherein said pulse signal has a constant on-time and such a period as gradually decreased with said lapse time increased.

6. A braking force distribution control system according to claim 1, further comprising:

wheel speed detection means for detecting wheel speeds of said front wheels and said rear wheels;

standard speed setting means for providing a certain increasing rate for each of the wheel speeds of said front and rear wheels detected by said wheel speed detection means and calculating a first set speed on the basis of said increasing rate for each of said front and rear wheels, providing a certain decreasing rate for each of the wheel speeds of said front and rear wheels detected by said wheel speed detection means and calculating a second set speed on the basis of said decreasing rate for each of said front and rear wheels, and selecting a medium value of said first set speed, said second set speed and said wheel speed of said front wheels or rear wheels detected by said detection means to set a standard speed for each of said front and rear wheels; and comparison means for comparing said standard speed of said front wheels and said standard speed of said rear wheels provided by said setting means, said control means actuating said valve means in response to a result of the comparison made in said comparison means to control the hydraulic braking pressure in said rear wheel brake cylinders in a certain relationship with the hydraulic braking pressure in said front wheel brake cylinders.

7. A braking force distribution control system according to claim 6, wherein said increasing rate is set on the basis of a certain value of gravitational acceleration, and wherein said decreasing rate is set on the basis of each of the wheel accelerations of said front and rear wheels calculated from the front and rear wheel speeds.

* * * * *